United States Patent
Frank et al.

(10) Patent No.: US 8,473,578 B2
(45) Date of Patent: *Jun. 25, 2013

(54) DATA STORAGE DEVICES HAVING IP CAPABLE PARTITIONS

(75) Inventors: Charles Frank, Irvine, CA (US); Thomas Ludwig, San Clemente, CA (US); Thomas Hanan, Mission Vlejo, CA (US); William Babbitt, Perris, CA (US)

(73) Assignee: Rateze Remote Mgmt, L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,544

(22) Filed: Jul. 28, 2011

(65) Prior Publication Data

US 2011/0283084 A1 Nov. 17, 2011

Related U.S. Application Data

(63) Continuation of application No. 10/473,509, filed as application No. PCT/US02/40199 on Dec. 16, 2002, now Pat. No. 8,005,918.

(60) Provisional application No. 60/425,867, filed on Nov. 12, 2002.

(51) Int. Cl.
*G06F 15/173* (2006.01)

(52) U.S. Cl.
USPC .............................. 709/217; 709/245; 711/111

(58) Field of Classification Search
USPC .................................. 709/217, 245; 711/111
See application file for complete search history.

(56) References Cited

U.S. PATENT DOCUMENTS

| | | | |
|---|---|---|---|
| 4,422,171 A | 12/1983 | Wortley |
| 4,617,657 A | 10/1986 | Drynan |
| 4,890,227 A | 12/1989 | Watanabe |
| 5,129,088 A | 7/1992 | Auslander |
| 5,193,171 A | 3/1993 | Shinmura |
| 5,444,709 A | 8/1995 | Riddle |
| 5,546,541 A | 8/1996 | Drew |
| 5,590,124 A | 12/1996 | Robins |
| 5,590,276 A | 12/1996 | Andrews |
| 5,634,111 A | 5/1997 | Oeda |

(Continued)

FOREIGN PATENT DOCUMENTS

| | | |
|---|---|---|
| EP | 0485110 | 5/1992 |
| EP | 0654736 | 5/1995 |

(Continued)

OTHER PUBLICATIONS

Anderson, et al., "Serverless Network File Systems," In Proceedings of the 15th Symposium on Operating Systems Principles, Dec. 1995.

(Continued)

*Primary Examiner* — David Lazaro
*Assistant Examiner* — Marie Georges Henry
(74) *Attorney, Agent, or Firm* — Schwabe, Williamson & Wyatt, P.C.

(57) ABSTRACT

Apparatuses, methods, and systems related to IP-addressable partitions are disclosed. In some embodiments an IP address is used to uniquely identify a selected subset of partitions. Other embodiments may be described and claimed.

20 Claims, 4 Drawing Sheets

U.S. PATENT DOCUMENTS

| | | | |
|---|---|---|---|
| 5,742,604 A | 4/1998 | Edsall | |
| 5,758,050 A | 5/1998 | Brady | |
| 5,771,354 A | 6/1998 | Crawford | |
| 5,850,449 A | 12/1998 | McManis | |
| 5,867,686 A | 2/1999 | Conner | |
| 5,884,038 A | 3/1999 | Kapoor | |
| 5,889,935 A | 3/1999 | Ofek | |
| 5,930,786 A | 7/1999 | Carino, Jr. | |
| 5,937,169 A | 8/1999 | Connery | |
| 5,948,062 A | 9/1999 | Tzelnic | |
| 5,949,977 A | 9/1999 | Hernandez | |
| 5,983,024 A | 11/1999 | Fye | |
| 5,991,891 A | 11/1999 | Hahn | |
| 6,018,779 A | 1/2000 | Blumenau | |
| 6,081,879 A | 6/2000 | Arnott | |
| 6,101,559 A | 8/2000 | Schultz | |
| 6,105,122 A | 8/2000 | Muller | |
| 6,128,664 A | 10/2000 | Yanagidate | |
| 6,157,935 A | 12/2000 | Tran | |
| 6,157,955 A | 12/2000 | Narad | |
| 6,202,060 B1 | 3/2001 | Tran | |
| 6,246,683 B1 | 6/2001 | Connery | |
| 6,253,273 B1 | 6/2001 | Blumenau | |
| 6,259,448 B1 | 7/2001 | McNally | |
| 6,275,898 B1 | 8/2001 | Dekoning | |
| 6,288,716 B1 | 9/2001 | Humpleman | |
| 6,295,584 B1 | 9/2001 | DeSota | |
| 6,330,236 B1 | 12/2001 | Ofek | |
| 6,330,615 B1 | 12/2001 | Gioquindo | |
| 6,330,616 B1 | 12/2001 | Gioquindo | |
| 6,389,448 B1 | 5/2002 | Primak | |
| 6,401,183 B1 | 6/2002 | Rafizadeh | |
| 6,434,683 B1 | 8/2002 | West | |
| 6,449,607 B1 | 9/2002 | Tomita | |
| 6,466,571 B1 | 10/2002 | Dynarski | |
| 6,470,342 B1 | 10/2002 | Gondi | |
| 6,473,774 B1 | 10/2002 | Cellis | |
| 6,480,934 B1 | 11/2002 | Hino | |
| 6,487,555 B1 | 11/2002 | Bharat | |
| 6,535,925 B1 | 3/2003 | Svanbro | |
| 6,567,863 B1 | 5/2003 | Lafuite | |
| 6,597,680 B1 * | 7/2003 | Lindskog et al. | 370/347 |
| 6,601,101 B1 | 7/2003 | Lee | |
| 6,601,135 B1 | 7/2003 | McBrearty | |
| 6,618,743 B1 | 9/2003 | Bennett | |
| 6,629,162 B1 | 9/2003 | Arndt | |
| 6,629,264 B1 | 9/2003 | Sicola | |
| 6,636,958 B2 | 10/2003 | Abboud | |
| 6,678,241 B1 | 1/2004 | Gai | |
| 6,683,883 B1 | 1/2004 | Czeiger | |
| 6,693,912 B1 | 2/2004 | Wang | |
| 6,701,432 B1 | 3/2004 | Deng | |
| 6,711,164 B1 | 3/2004 | Lee | |
| 6,732,171 B2 | 5/2004 | Hayden | |
| 6,732,230 B1 | 5/2004 | Johnson | |
| 6,741,554 B2 | 5/2004 | D'Amico | |
| 6,742,034 B1 | 5/2004 | Schubert | |
| 6,754,662 B1 | 6/2004 | Li | |
| 6,757,845 B2 | 6/2004 | Bruce | |
| 6,772,161 B2 | 8/2004 | Mahalingam | |
| 6,775,672 B2 | 8/2004 | Mahalingam | |
| 6,775,673 B2 | 8/2004 | Mahalingam | |
| 6,795,534 B2 | 9/2004 | Noguchi | |
| 6,799,244 B2 | 9/2004 | Tanaka | |
| 6,799,255 B1 | 9/2004 | Blumenau | |
| 6,834,326 B1 | 12/2004 | Wang | |
| 6,853,382 B1 | 2/2005 | Van Dyke | |
| 6,854,021 B1 | 2/2005 | Schmidt | |
| 6,862,606 B1 | 3/2005 | Major | |
| 6,876,657 B1 | 4/2005 | Brewer | |
| 6,882,637 B1 | 4/2005 | Le | |
| 6,895,461 B1 | 5/2005 | Thompson | |
| 6,895,511 B1 | 5/2005 | Borsato | |
| 6,901,497 B2 | 5/2005 | Tashiro | |
| 6,904,470 B1 | 6/2005 | Ofer | |
| 6,907,473 B2 | 6/2005 | Schmidt | |
| 6,912,622 B2 | 6/2005 | Miller | |
| 6,917,616 B1 | 7/2005 | Normand | |
| 6,922,688 B1 | 7/2005 | Frey, Jr. | |
| 6,934,799 B2 | 8/2005 | Acharya | |
| 6,941,555 B2 | 9/2005 | Jacobs | |
| 6,947,430 B2 | 9/2005 | Bilic | |
| 6,977,927 B1 | 12/2005 | Bates | |
| 6,983,326 B1 | 1/2006 | Vigue | |
| 6,985,956 B2 | 1/2006 | Luke | |
| 7,051,087 B1 | 5/2006 | Bahl | |
| 7,065,579 B2 | 6/2006 | Traversat | |
| 7,069,295 B2 * | 6/2006 | Sutherland et al. | 709/203 |
| 7,072,823 B2 | 7/2006 | Athanas | |
| 7,072,986 B2 | 7/2006 | Kitamura | |
| 7,073,090 B2 | 7/2006 | Yanai | |
| 7,111,303 B2 | 9/2006 | Macchiano | |
| 7,145,866 B1 | 12/2006 | Ting | |
| 7,149,769 B2 | 12/2006 | Lubbers | |
| 7,152,069 B1 | 12/2006 | Santry | |
| 7,181,521 B2 | 2/2007 | Knauerhase | |
| 7,184,424 B2 | 2/2007 | Frank | |
| 7,188,194 B1 | 3/2007 | Kuik | |
| 7,200,641 B1 | 4/2007 | Throop | |
| 7,203,730 B1 | 4/2007 | Meyer | |
| 7,225,243 B1 | 5/2007 | Wilson | |
| 7,237,036 B2 | 6/2007 | Boucher | |
| 7,243,144 B2 | 7/2007 | Miyake | |
| 7,254,620 B2 | 8/2007 | Iwamura | |
| 7,263,108 B2 | 8/2007 | Kizhepat | |
| 7,278,142 B2 | 10/2007 | Bandhole | |
| 7,296,050 B2 | 11/2007 | Vicard | |
| 7,404,000 B2 | 7/2008 | Lolayekar | |
| 7,421,736 B2 | 9/2008 | Mukherjee | |
| 7,428,584 B2 | 9/2008 | Yamamoto | |
| 7,475,124 B2 | 1/2009 | Jiang | |
| 7,526,577 B2 | 4/2009 | Pinkerton | |
| 7,535,913 B2 | 5/2009 | Minami | |
| 7,536,525 B2 | 5/2009 | Chandrasekaran | |
| 7,558,264 B1 | 7/2009 | Lolayekar | |
| 7,707,304 B1 | 4/2010 | Lolayekar | |
| 2001/0020273 A1 | 9/2001 | Murakawa | |
| 2001/0026550 A1 | 10/2001 | Kobayashi | |
| 2001/0034758 A1 | 10/2001 | Kikinis | |
| 2001/0049739 A1 | 12/2001 | Wakayama | |
| 2002/0026558 A1 | 2/2002 | Reuter | |
| 2002/0029256 A1 | 3/2002 | Zintel | |
| 2002/0029286 A1 | 3/2002 | Gioquindo | |
| 2002/0031086 A1 | 3/2002 | Welin | |
| 2002/0039196 A1 | 4/2002 | Chiarabini | |
| 2002/0062387 A1 | 5/2002 | Yatziv | |
| 2002/0065875 A1 | 5/2002 | Bracewell | |
| 2002/0087811 A1 | 7/2002 | Khare | |
| 2002/0091830 A1 | 7/2002 | Muramatsu | |
| 2002/0126658 A1 | 9/2002 | Yamashita | |
| 2002/0133539 A1 * | 9/2002 | Monday | 709/203 |
| 2003/0018784 A1 | 1/2003 | Lette | |
| 2003/0023811 A1 | 1/2003 | Kim | |
| 2003/0065733 A1 | 4/2003 | Pecone | |
| 2003/0093567 A1 | 5/2003 | Lolayekar | |
| 2003/0118053 A1 | 6/2003 | Edsall | |
| 2003/0130986 A1 | 7/2003 | Tamer | |
| 2003/0154305 A1 * | 8/2003 | Bethmangalkar et al. | 709/245 |
| 2003/0172157 A1 | 9/2003 | Wright | |
| 2003/0182349 A1 | 9/2003 | Leong | |
| 2003/0202510 A1 | 10/2003 | Witkowski | |
| 2004/0078465 A1 | 4/2004 | Coates | |
| 2004/0088293 A1 | 5/2004 | Daggett | |
| 2004/0160975 A1 | 8/2004 | Frank | |
| 2004/0170175 A1 | 9/2004 | Frank | |
| 2004/0181476 A1 | 9/2004 | Smith | |
| 2004/0184455 A1 | 9/2004 | Lin | |
| 2004/0213226 A1 | 10/2004 | Frank | |
| 2004/0215688 A1 | 10/2004 | Frank | |
| 2005/0138003 A1 | 6/2005 | Glover | |
| 2005/0144199 A2 | 6/2005 | Hayden | |
| 2005/0165883 A1 | 7/2005 | Lynch | |
| 2005/0166022 A1 | 7/2005 | Watanabe | |
| 2005/0175005 A1 | 8/2005 | Brown | |
| 2005/0198371 A1 | 9/2005 | Smith | |
| 2005/0246401 A1 | 11/2005 | Edwards | |
| 2005/0267929 A1 | 12/2005 | Kitamura | |

| | | | |
|---|---|---|---|
| 2005/0270856 | A1 | 12/2005 | Earhart |
| 2005/0286517 | A1 | 12/2005 | Babbar |
| 2006/0029068 | A1 | 2/2006 | Frank |
| 2006/0029069 | A1 | 2/2006 | Frank |
| 2006/0029070 | A1 | 2/2006 | Frank |
| 2006/0036602 | A1 | 2/2006 | Unangst |
| 2006/0101130 | A1 | 5/2006 | Adams |
| 2006/0126666 | A1 | 6/2006 | Frank |
| 2006/0168345 | A1 | 7/2006 | Siles |
| 2006/0176903 | A1 | 8/2006 | Coulier |
| 2006/0182107 | A1 | 8/2006 | Frank |
| 2006/0206662 | A1 | 9/2006 | Ludwig |
| 2006/0253543 | A1 | 11/2006 | Frank |
| 2006/0272015 | A1 | 11/2006 | Frank |
| 2007/0043771 | A1 | 2/2007 | Ludwig |
| 2007/0083662 | A1 | 4/2007 | Adams |
| 2007/0101023 | A1 | 5/2007 | Chhabra |
| 2007/0110047 | A1 | 5/2007 | Kim |
| 2007/0168396 | A1 | 7/2007 | Adams |
| 2007/0230476 | A1 | 10/2007 | Ding |
| 2007/0237157 | A1 | 10/2007 | Frank |

FOREIGN PATENT DOCUMENTS

| | | |
|---|---|---|
| EP | 0700231 | 3/1996 |
| EP | 0706113 | 4/1996 |
| JP | 61033054 | 2/1986 |
| JP | 62233951 | 10/1987 |
| JP | 63090942 | 4/1988 |
| JP | 05347623 | 12/1993 |
| JP | 7325779 | 12/1995 |
| JP | 09149060 | 6/1997 |
| JP | 10-333839 | 12/1998 |
| JP | 2000267979 | 9/2000 |
| JP | 2002318725 | 10/2002 |
| JP | 2004054562 | 2/2004 |
| JP | 2004056728 | 2/2004 |
| TW | 223167 | 11/2004 |
| WO | WO0215018 | 2/2002 |
| WO | WO0271775 | 9/2002 |

OTHER PUBLICATIONS

Beck, Micah, et al., An End-to-End Approach for Globally Scalable network Storage, ACM SIGCOMM Computer Communication Review; vol. 32, Issue 4, Proceedings of the 2002 SIGCOMM Conference; pp. 339-346; Oct. 2002.
Bruschi, et al., "Secure multicast in wireless networks of mobile hosts: protocols and issues", Mobile Networks and Applications, vol. 7, issue 6 (Dec. 2002), pp. 503-511.
Chavez, A Multi-Agent System for Distributed Resource Allocation, MIT Media Lab, XP-002092534, Int'l Conference on Autonomous Agents, Proceedings of the First Int'l Conference on Autonomous Agents, Marina del Rey, California, US, Year of Publication: 1997.
Cisco Systems, "Computer Networking Essentials," Copyright 2001.
Gibson, Garth; A Cost Effective High-Bandwidth Storage Architecture; ACM SIGOPS Operating Systems Review, col. 32, issue 5, pp. 92-103; 1998.
Gibson, Garth; File Server Scaling with Network-Attached Secure Disks; Joint Int'l Conference on Measurement & Modeling of Computer Systems Proceedings of the 1997 ACM SIGMETRICS Int'l Conference on Measurement & Modeling of Computer Systems; pp. 272-284; 1997.
IBM Technical Disclosure Bulletin, Vo. 35, No. 4a, pp. 404-405, XP000314813, Armonk, NY, USA, Sep. 1992.
Kim et al., "Internet Multicast Provisioning Issues for Hierarchical Architecture", Dept of Computer Science, Chung-Nam National University, Daejeon, Korea, Ninth IEEE International Conference, pp. 401-404., IEEE, published Oct. 12, 2001.
Lee et al. "A Comparison of Two Distributed Disk Systems" Digital Systems Research Center—Research Report SRC-155, Apr. 30, 1998, XP002368118.
Lee, et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, pp. 84-92, XP000681711, ISBN: 0-89791-767-7, Oct. 1, 1996.
Lin, et al., "RMTP: A Reliable Multicast Transport Protocol," Proceedings of IEEE INFOCOM '96, vol. 3, pp. 1414-1424, 1996.
Quinn, et al., "IP Multicast Applications: Challenges and Solutions," Network Working Group, RFC 3170, Sep. 2001.
Robinson, Chad; The Guide to Virtual Services; Linux Journal, vol. 1997 Issue 35; Mar. 1997.
Satran et al. "Internet Small Computer Systems Interface (iSCSI)" IETF Standard, Internet Engineering Task Force, IETF, CH, XP015009500, ISSN: 000-0003, Apr. 2004.
Satran et al., "Internet Small Computer Systems Interface (iSCSI)" Internet Draft draft-ietf-ips-iscsi-19.txt, Nov. 3, 2002.
Virtual Web mini-HOWTO Parag Mehta; www.faqs.or/docs/Linux-mini/Virtual-Web.html; Jun. 6, 2001.
VMWare Workstation User's Manual, VMWare, Inc., p. 1-420, XP002443319; www.vmware.com/pdf/ms32_manual.pdf; p. 18-21; p. 214-216; p. 273-282; copyright 1998-2002.
WebTen User's Guide; Version 3.0, Jan. 2000; http://www.tenan.com/products/webten/WebTenUserGuide/1_Introduction.html; Jan. 2000.
WebTen User's Guide; Version 7.0; http://www.tenon.com/products/webten/WebTenUserGuide/8_VirtualHosts.html, Chapter 8; Mar. 2008.
Office Action re U.S. Appl. No. 10/473,509 dated Jul. 1, 2010.
Final Office Action re U.S. Appl. No. 11/243,137 dated Mar. 17, 2010.
Final Office Action re U.S. Appl. No. 11/243,143 dated Feb. 19, 2010.
Notice of Allowance for U.S. Appl. No. 11/243,143 mailed Sep. 7, 2010.
Final Office Action re U.S. Appl. No. 11/479,711 dated Apr. 1, 2009.
Notice of Allowance for U.S. Appl. No. 11/479,711 mailed Jun. 22, 2010.
Supplemental Notice of Allowance for U.S. Appl. No. 11/479,711 mailed Dec. 28, 2010.
International Search Report for PCT/US2002/040199 mailed May 8, 2003.
Written Opinion for PCT/US2002/040199 mailed Jun. 21, 2004.
International Preliminary Examination Report for PCT/US2002/040199 mailed Sep. 24, 2004.
Chinese Office action for 02829871.3 mailed Sep. 8, 2006.
Chinese Office action for 02829871.3 mailed Feb. 15, 2008.
Chinese Office action for 02829871.3 mailed Aug. 1, 2008.
Chinese Notice of Grant for 02829871.3 mailed Jun. 26, 2009.
European Search Report for 02797354.4 mailed Jul. 31, 2007.
European Office action for 02797354.4 mailed Nov. 9, 2007.
European Office action for 02797354.4 mailed May 23, 2008.
European Office action for 02797354.4 mailed Aug. 16, 2010.
Indian Office action for 1600/DELNP/05 mailed Jan. 9, 2006.
Indian Office action for 1600/DELNP/05 mailed Oct. 3, 2006.
Indian Office action for 1600/DELNP/05 mailed Jan. 5, 2007.
Japanese Office action for 2004-551382 mailed Nov. 1, 2005.
Japanese Final Office action for 2004-551382 mailed Mar. 28, 2006.

* cited by examiner

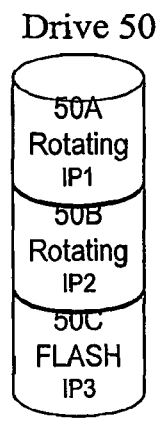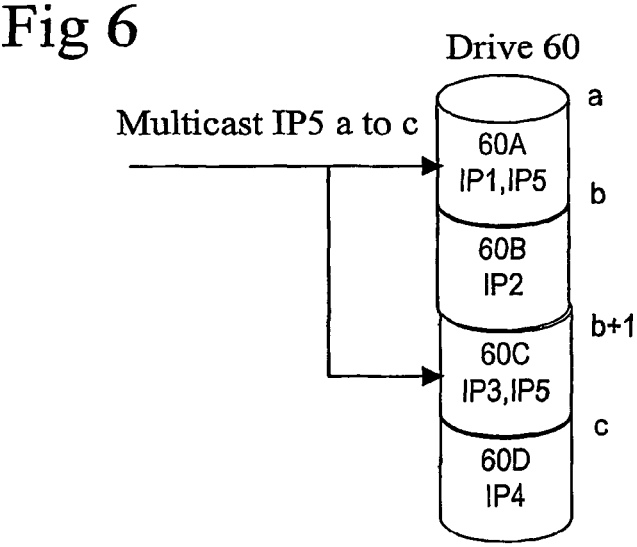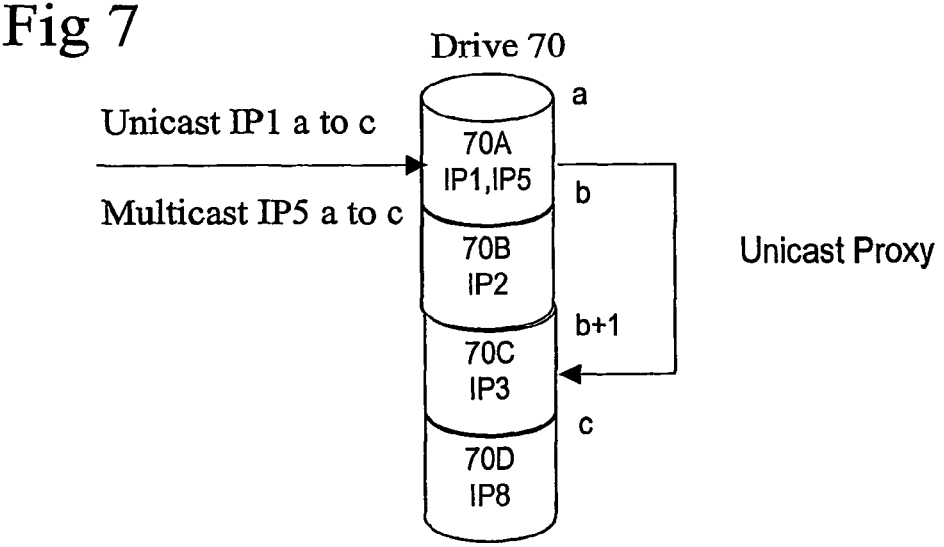

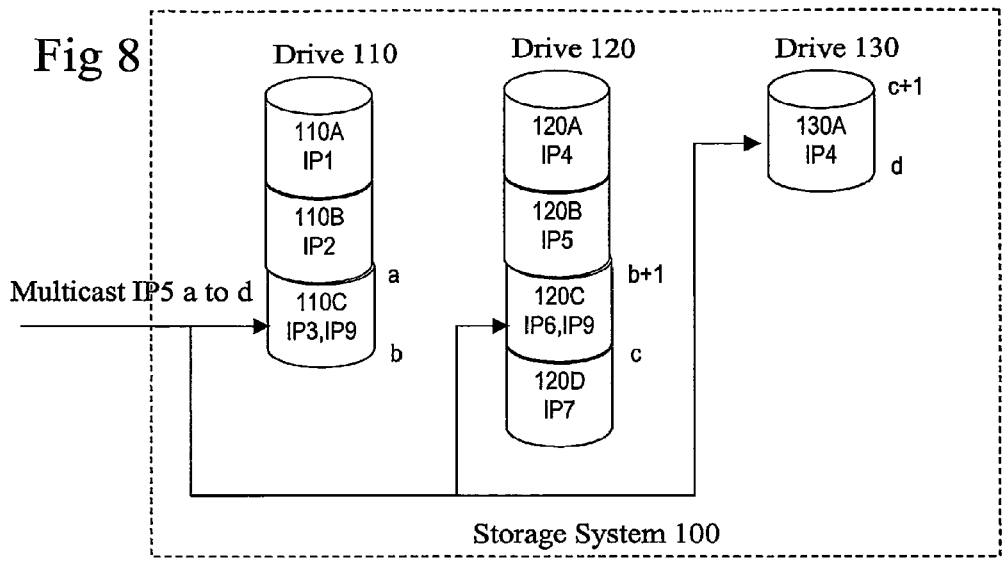
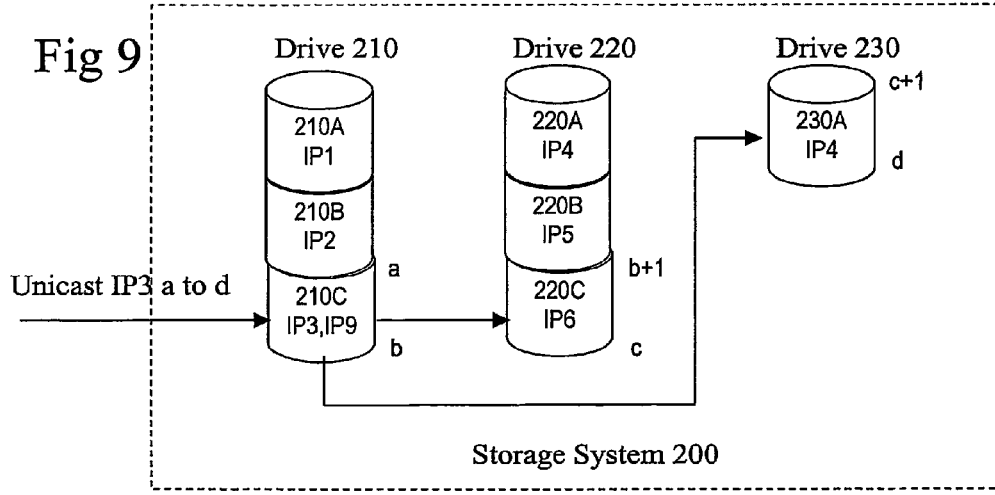

DATA STORAGE DEVICES HAVING IP CAPABLE PARTITIONS

RELATED APPLICATION

The present application is a continuation of U.S. patent application Ser. No. 10/473,509, entitled "DATA STORAGE DEVICES HAVING IP CAPABLE PARTITIONS," issued on Aug. 23, 2011 as U.S. Pat. No. 8,005,918, which is a national stage entry of PCT/US02/40199 filed Dec. 16, 2002 and claims priority to U.S. Provisional Application No. 60/425,867, entitled "DATA COMMUNICATION AND STORAGE METHODS AND DEVICES," filed on Nov. 12, 2002. The specifications of these applications are fully incorporated by reference.

FIELD OF THE INVENTION

The field of the invention is data storage devices.

BACKGROUND OF THE INVENTION

There is a trend within the field of electronics to physically (i.e. geographically) disaggregate functionality, and to rely instead on networked resources. Of special interest are resources available over a packet communications network such as the Internet. In addition to the data being transferred, packets include header information such as type of data contained in the packet, i.e. HTML, voice, ASCII, etc., and origination and destination node information. The header information permits error checking, and routing across packet switched networks such as the Internet between devices that may be widely spaced apart. The header information also allows extremely disparate devices to communicate with each other—such as a clock radio to communicate with a computer. Recently published US patent application no. 20020031086, (Welin, Mar. 14, 2002) refers to linking "computers, EP phones, talking toys and home appliances such as refrigerators, microwave ovens, bread machines, blenders, coffee makers, laundry machines, dryers, sweepers, thermostat assemblies, light switches, lamps, fans, drape and window shade motor controls, surveillance equipment, traffic monitoring, clocks, radios, network cameras, televisions, digital telephone answering devices, air conditioners, furnaces and central air conditioning apparatus."

Communications with storage devices has not kept pace with the trend to disaggregate resources. Disk access has always been under the control of a disk operating system such as DOS, or Microsoft® Windows®. Unfortunately, putting the operating system at the conceptual center of all computing devices has resulted in a dependence on such operating systems, and has tended to produce ever larger and more complicated operating systems. Now that many electronic devices, from personal digital assistants to telephones, digital cameras, and game consoles, are becoming smaller and ever more portable, the dependence on large operating systems has become a liability. One solution is to provide a stripped-down operating system that requires much less overhead. Microsoft® CE® is an example. That solution, however, sacrifices considerable functionality present in the larger systems.

What is needed is a storage device that can be directly accessed by multiple other devices, without the need to go through an operating system.

SUMMARY OF THE INVENTION

In the present invention a storage device has partitions that are separately addressed by distinct IP addresses. This allows direct access of the partitions, on a peer-to-peer basis, by any other device that can communicate using IP. Many limitations on access to the storage device can thereby be eliminated, including geographical limitations, and the need for a given storage partition to be under the central control of a single operating system.

Preferred storage devices support spanning between or among partitions of the same device, as well as between or among different storage devices. Both multicast and proxy spanning are contemplated.

Combinations of the inventive storage devices with each other, and with prior art storage devices are contemplated, in all manner of mirroring and other arrangements.

In still other aspects of the invention, a given storage device can comprise one or more types of media, including any combination of rotating and non-rotating media, magnetic and optical, and so forth.

Various objects, features, aspects and advantages of the inventive subject matter will become more apparent from the following detailed description of preferred embodiments, along with the accompanying drawing figures.

BRIEF DESCRIPTION OF THE DRAWING

FIG. 5 is a schematic of a storage device having multiple partitions comprising different storage media.

FIG. 6 is a schematic of a storage device having multiple partitions, two of which are spanned using multicast spanning.

FIG. 7 is a schematic of a storage device having multiple partitions, two of which are spanned using proxy spanning.

FIG. 8 is a schematic of a storage system in which three storage devices are logically coupled using multicast spanning.

FIG. 9 is a schematic of a storage system in which three storage devices are logically coupled using proxy spanning.

DETAILED DESCRIPTION

Figure 1:
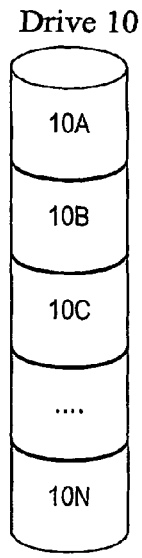
FIG. 1 is a schematic of a prior art disk drive split into multiple partitions, but where the entire memory is accessed using a single IP address.

Prior art FIG. 1 generally depicts a disk drive 10 that is split into multiple partitions $10_A$, $10_B$, $10_C$ . . . $10_N$. The entire storage area is addressed using a single address $IP_1$, with individual blocks of data being addressed by a combination of $IP_1$ and some other information such as partition and offset, or Logical Block Address (LBA). The data is thus always accessed under the control of a disk operating system that provides the additional information. For that reason drive 10 is usually located very close to the processor that runs the operating system, and is usually connected to a hard bus of a computer, RAID or other system.

It is known to format the various partitions 10A ... 10N differently from one another, under control of different operating systems. However, the entire memory space comprises a single media type, namely rotating magnetic memory, even though there may be some sort of RAM buffer (not shown).

It should be appreciated that the term "IP" is used herein in a broad sense, to include any networking protocol. Thus, an IP address is used as a euphemism for a network address.

Figure 2:
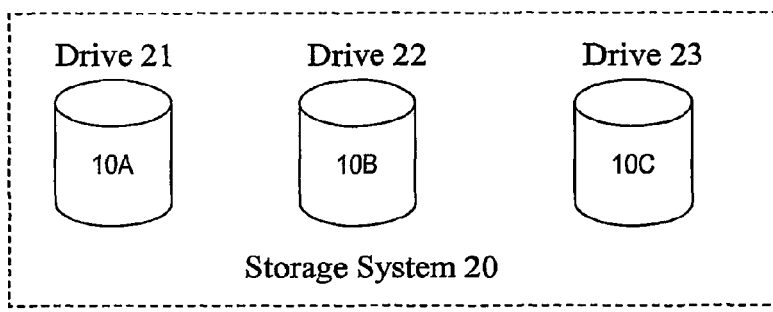
FIG. 2 is a schematic of a prior art storage system in which three disk drives are addressed in their entireties using three different IP addresses.

Prior art FIG. 2 generally depicts a storage system 20 in which three disk drives 21, 22, 23 are addressed using three different IP addresses, IP1, IP2, and IP3. The drives can have multiple partitions (drive 21 has three partitions $21_A$, $21_B$, $21_C$ (not shown), and drive 23 has two partitions $23_A$ and $23_B$ (not shown)), but here again individual blocks of data are addressed using a combination of the IP address, some other information such as partition and offset, or LBA. Drives 21, 22, 23 can be spanned and/or mirrored, but the data on each drive is always accessed using that drive's particular IP address.

Figure 3:
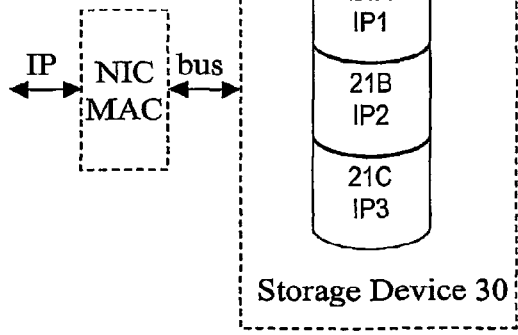
FIG. 3 is a schematic of a storage device having multiple partitions that are separately addressed by different IP addresses.

In FIG. 3 is a storage device 30 according to the present invention has three partitions $21_A$, $21_B$, $21_C$, which are separately addressed by different IP addresses $IP_1$, $IP_2$, $IP_3$, respectively. Those skilled in the art will appreciate that showing a small plurality of partitions is merely a matter of convenience, in this and other figures, and that storage device 30 could have any practical number of partitions. Similarly, it should be appreciated that depicting storage devices without partitions indicates that such devices have no partitions.

Utilizing IP addresses to route packets directly to and from partitions facilitates the use of very light communication protocols. In particular, the partitions may be directly addressed at the IP level of TCP/IP or UDP/IP stack. It should be appreciated, however, that in order make use of the IP addresses, the storage device 30 (and indeed the various partitions) would need to have sufficient functionality to communicate using IP. That functionality could be designed into the devices (or partitions), or it could be added onto storage devices using an IP adapter 32 (not shown). Indeed, the adapter in such circumstances would essentially be a simple block-to-packet and packet-to-block translator.

Storage device 30 can be connected to any suitable bus by any suitable means. Thus, the operative principles herein can operate across a wide variety of physical buses and protocols, including ATA, ATAPI, SCSI, Fiber CH, PCMCIA, CardBus, and USB. Storage device 30 can also alternatively or additionally operate across a network acting as a virtual IP bus, with the term "IP" being used herein generically with reference to any internetworking protocol that handles packets. It is contemplated, for example, that a user may have a stand-alone storage device that communicates wirelessly with a Local Area Network (LAN), which in turn may be connected to a WAN or to the Internet. Other devices that are also connected to the network (whether in the home, office, or elsewhere) could directly access one or more partitions of the storage device. For example, an IP capable television (not shown) could display images or movies stored on one partition, while a digital camera (not shown) could store/retrieve images on another partition. Still another partition might hold an operating system and office software for use with a laptop, or even an IP capable display and IP capable keyboard and mouse. Printing from any of the partitions might occur on an IP capable printer that is also connected wirelessly, or by hardwire, to the network.

An interesting corollary is that the partitions or other elements can all communicate as peers on a peer-to-peer network. As used herein, the term "element" refers to a hardware unit that is a functional portion of a device, and traditionally communicates with other units of the same device across a bus, without having its own IP address. This can completely eliminate dependence on any particular operating system, and can eliminate operating systems altogether. In addition, many of the elements attached to the network will be dependent on other elements attached to the network to perform tasks that are not within their individual capacities, and will be able to discover, reserve, and release the resources of other peers needed to perform such tasks. Peers will preferably be able to discover the other elements attached to the network, the characteristics of the other elements attached to the network, and possibly the contents of at least same of the elements attached to the network. Such discovery is accomplished without the assistance of a master device, and will preferably involve direct communication between the peer elements.

Preferred networks will be masterless in that all elements have equal access to the network and the other elements attached to the network. The peer elements of the network will preferably communicate with each other utilizing low-level protocols such as those that would equate to those of the transport and lower layers of the OSI model. Preferred embodiments will utilize TCP and UDP IP protocols for communication between elements.

Storage device 30 is preferably able to dynamically create partitions upon receipt of requests from network elements. For example, when a network element requests use of device 30, the network element may provide a unique identifier, possibly a name, to storage device 30, which in turn associates the identifier with any newly created partition. In some instances the network element may also request a particular storage size to be allocated, including all of the remaining storage available on the storage device 30.

In preferred embodiments, the IP addresses for such partitions are obtained from an address server such as a DHCP server upon request from the storage device 30. It is important to note, however, that address allocation devices such as DHCP servers are not masters, since they don't control the network, elements coupled to the network, or the sharing of resources between elements. Assignment of IP addresses to partitions may additionally or alternatively occur during initialization of the device, such as when it is first turned on.

Since storage device 30 may be associated with only a single network interface card (NIC), it is preferred that storage elements be able to obtain multiple IP addresses despite having a single NIC and a single media access control (MAC) address. This can be accomplished by providing a unique partition identifier to an address server when trying to obtain a IP address from the address server. It is contemplated that associating a name provided by an element with any partition created for that element makes it possible to identify each of the partitions of a storage element, despite the fact that IP address associated with each partition may have changed since the partition was created.

Additional details can be found in concurrently filed PCT application no. PCT/US02/40205 entitled "Communication Protocols, Systems and Methods" and PCT application no. PCTUS02/40198, entitled "Electrical Devices With Improved Communication", the disclosures of which are incorporated herein by reference.

Figure 4:
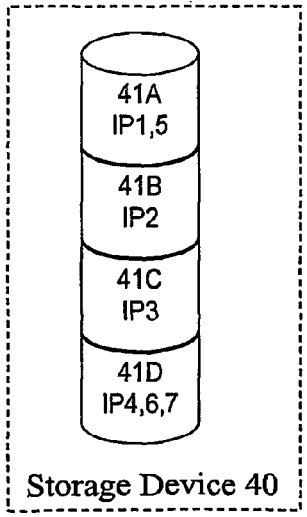
FIG. 4 is a schematic of a storage device having multiple partitions that are separately addressed by different IP addresses, and some of the partitions are addressed using multiple IP addresses.

In FIG. 4, storage device 40 is similar to storage device 30 in that it has multiple partitions $41_A$, $41_B$, $41_C$, $41_D$ that are separately addressed by different IP addresses $IP_1$, $IP_2$, $IP_3$, $IP_4$, respectively. But here some of the partitions are addressed using multiple IP addresses. In particular, partition $41_A$ is addressed with $IP_1$ and $IP_5$. Partition $41_D$ is addressed with $IP_4$, $IP_6$ and $IP_7$.

In FIG. 5 a storage device 50 has multiple partitions comprising different storage media. In this particular example there are 2 partitions of rotating media $50_A$, $50_B$, one partition of flash memory $50_C$. All other practical combinations of these and other media are also contemplated. As in FIG. 3, the various partitions are separately addressed by different IP addresses $IP_1$, $IP_2$, $IP_3$, respectively.

In FIG. 6 a storage device 60 has multiple partitions $60_A$, $60_B$, $60_C$, $60_D$, addressed by IP addresses $IP_1$, $IP_2$, $IP_3$, $IP_4$, and $IP_5$ (multicast) respectively. Two of these partitions, $60_A$ and $60_C$, are spanned in that partition $60_A$ extends from logical address a to logical address b, while partition $60_C$ continues from logical address b+1 to logical address c. The spanned set is thus logical address a to logical address c. The spanning here is multicast spanning, because the partitions share multicast IP5 which is used to address both partitions $60_A$ and $60_C$.

In FIG. 7 a storage device 70 has multiple partitions $70_A$, $70_B$, $70_C$, $70_D$, addressed by IP addresses $IP_1$, $IP_2$, $IP_3$, $IP_8$, respectively. (The use of $IP_8$ here rather than $IP_4$ is intended to illustrate that the IP addresses need not be consecutive in any manner.) Here again two of the partitions are spanned, $70_A$ and $70_C$, in that partition $70_A$ extends from logical address a to logical address b, while partition $70_C$ continues from logical address b+1 to logical address c. The spanned set is thus once again logical address a to logical address c. Here, however, we are dealing with proxy spanning as opposed to multicast spanning. $IP_1$ is used to address partition $70_A$, while the second part of the spanned data, in partition $70_C$, is addressed by the IP1 proxy using $IP_3$. Of course, it is possible to combine multicast spanning and proxy spanning within the same storage device.

In FIG. 8 a storage system 100 has three storage devices 110, 120, and 130 coupled to depict multicast spanning. Device 110 has three partitions $110_A$, $110_B$ and $110_C$, which are separately addressed using IP addresses $IP_1$, $IP_2$, and $IP_3$, respectively. Device 120 has four partitions $120_A$, $120_B$, $120_C$, and $120_D$, which are separately addressed using IP addresses IN, $IP_5$, $IP_6$, and $IP_7$, respectively. Device 130 is not partitioned, which for our purposes is the same as saying that it only has one partition. The entirely of the storage area of device 130 is addressed using IP address $IP_8$. The spanning in this case is among all three drives. Partition 110C extends from logical address a to logical address b; partition 120D continues from logical address b+1 to logical address c, and the data space of device 130 extends from logical address c+1 to logical address d. The data set extends from logical address a to logical address d.

FIG. 9 is similar to FIG. 8, in that spanning occurs across three drives, and the data set extends from logical address a to logical address d. The main conceptual difference is that the storage devices are logically coupled using proxy spanning rather than multicast spanning. Here, device 210 has three partitions $210_A$, $210_B$ and $210_C$, which are separately addressed using IP addresses $IP_1$, $IP_2$, and $IP_3$, respectively. Device 230 is not partitioned. The entirely of the storage area of device 230 is addressed using IP address $IP_4$. Device 220 has three partitions, $220_A$, $220_B$ and $220_C$, which are separately addressed using IP addresses $IP_4$, $IP_5$, and $IP_6$, respectively. Partition $210_C$ extends from logical address a to logical address b; the data space of partition $220_C$ continues from logical address b+1 to logical address c, and partition 230 extends from logical address c+1 to logical address d.

As elsewhere in this specification, the specific embodiments shown with respect to FIG. 9 are merely examples of possible configurations. A greater or lesser number of storage devices could be utilized, and indeed spanning may be protean, in that devices and/or partitions may be added to or dropped from the spanning over time. There can also be any combination of multicast and proxy spanning across and/or within storage devices, which may have the same or different media. Moreover, the use of IP addresses facilitates physically locating the various storage devices virtually anywhere an IP network can reach, regardless of the relative physical locations among the devices.

Figure 10:
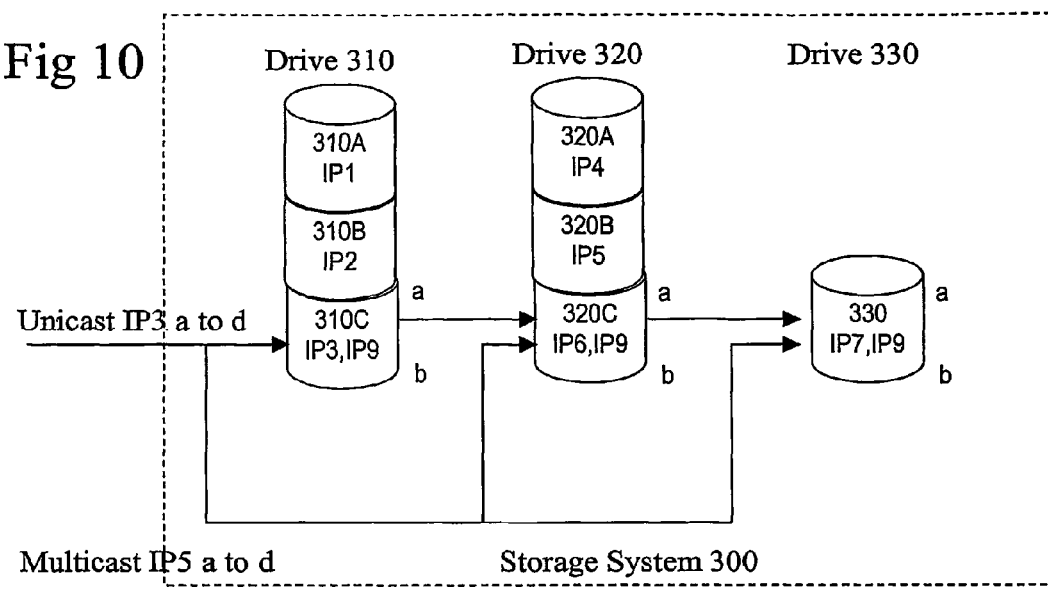
FIG. 10 is a schematic of a storage system in which partitions of a first storage device are mirrored on partitions of one or more additional storage device using multicast mirroring.

In FIG. 10 a storage system 300 provides mirroring of partitions between three different physical storage devices 310, 320 and 330. This could be done by proxy, in a manner analogous to that described above for proxy spanning, or in higher performance systems using multicasting. Thus, partitions in multiple storage devices are addressed using the same IP address. In this particular embodiment, storage device 310 has partitions $310_A$, $310_B$, and $310_C$, addressed using IP addresses $IP_1$, $IP_2$, $IP_3$ and $IP_9$. Storage device 320 has partitions $320_A$, $320_B$, and $320_C$, addressed using IP addresses $IP_4$, $IP_5$, IP6 and $IP_9$. Write requests to $IP_3$ or $IP_9$ will result in partition $310_C$, $320_C$ and $330_C$ storing the same data. Read requests to $IP_1$ address will result in $310_C$, $320_C$ and $330_C$ responding with the same information, with presumably the requester using whichever data arrives first. In the Multicast form it may be preferred that device 310,320 and 330 listen for the first data returned by any member of the mirrored set, and then remove that request from their request que if another device completes the request before they complete the request.

Communications

In preferred embodiments, communications between a storage element and a non-storage element, will utilize a datagram protocol in which data blocks are atomically mapped to a target device. A datagram sent between elements will preferably comprise command (CMD), logical block address (LBA), data, and token fields, and no more than X additional bytes where X is one of 1, 2, 7, 10, 17, and 30. The data field of such a datagram is preferably sized to be the same as the block size (if applicable) of the element to which the datagram is addressed. As such, an element sending a quantity of data to a storage element where the quantity of data is larger than the block size of the storage element will typically divide the quantity of data into blocks having the same size as the blocks of the storage element, assign LBAs to the blocks, and send each block and LBA pair to the storage element in a datagram.

It is preferred that the datagrams be communicated between elements encapsulating them within addressed packets such as IP packets, and the IP address of the encapsulating packet be used to identify both the element a packet is intended to be sent to, and the partition within the element that the datagram pertains to.

It is preferred that datagram recipients handle datagrams on a first come, first served basis, without reordering packets, and without assembling the contents of the data fields of datagrams into a larger unit of data prior to executing a command identified in the CMD field. As an example, an storage element may receive a datagram containing a block of data, an LBA, and a write command. The storage element, without having to wait for any additional packets, utilizes the IP address of the packet enclosing the datagram to identify the partition to be used, and utilizes the LBA to identify the location within the partition at which the data in the data field is to be written.

Handling the data in individual datagrams as they arrive rather than reassembling the data permits the use of an implied ACK for each command. Using an implied rather than an explicit ACK results in a substantial increase in performance.

Marketing of Storage Devices and Adapters

It is contemplated that once persons in the industry recognize the benefits of having storage devices having partitions that are accessed using their own IP addresses, companies will start producing and/or marketing such devices It is also contemplated that companies will start producing and/or marketing adapters that includes a functionality (hardware or software, or come combination of the two) to permit traditional disk drives, flash memories, and other storage devices to operate in that manner.

Thus, methods falling within the inventive subject matter include manufacturing or selling a disk drive or other storage device in which the partitions can utilize their own IP addresses to execute packet communication with other network elements. Other inventive methods include manufacturing or selling adapters that enable prior art type storage devices to do the same. Indeed it is contemplated that companies will recognize that such adapters are available, and will continue to manufacture or sell prior art type storage devices, knowing (or even advertising) that users can employ such adapters to enable the prior art type storage devices to use in an infringing manner.

Thus, specific embodiments and applications of the inventive storage devices have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An apparatus comprising:
   a network interface;
   one or more storage media having a plurality of partitions; and
   one or more storage elements communicatively coupled to the one or more storage media and the network interface and configured
      to receive a packet from an external network via the network interface, the packet including an internet protocol (IP) address that uniquely identifies a selected subset of the plurality of partitions distinct from a non-selected subset of the plurality of partitions, the selected subset including at least two non-consecutive partitions, the packet further including a datagram having a command and a block address; and
      to access a block within a partition of the selected subset based at least in part on the command, the block address, and the IP address.

2. The apparatus of claim 1, wherein the one or more storage elements comprise a packet-to-block translator.

3. The apparatus of claim 1, wherein the block address comprises a logical block address, and the block within the partition is a physical block that corresponds to the logical block address.

4. The apparatus of claim 3, wherein the partition is a first partition, the physical block is a first physical block, and a second partition of the selected subset includes a second physical block that corresponds to the logical block address.

5. The apparatus of claim 1, wherein the selected subset comprises a plurality of physical blocks that respectively correspond to a plurality of consecutive logical block addresses.

6. The apparatus of claim 1 wherein a storage element of the one or more storage elements is configured to execute the command to store data within the partition independent of any other received packets.

7. The apparatus of claim 1, wherein the one or more storage elements are configured to receive the packet from a network peer.

8. The apparatus of claim 1, wherein the one or more storage elements are configured to implement a protocol compatible with a user datagram protocol communication and a transmission control protocol communication.

9. The apparatus of claim 1, wherein the packet comprises a user datagram protocol packet.

10. The apparatus of claim 1, wherein a first partition of the selected subset is on a first storage device of the one or more storage media, and a second partition of the selected subset is on a second storage device of the one or more storage media.

11. The apparatus of claim 10, wherein the first storage device is a first type of storage media and the second storage device is a second type of storage media.

12. The apparatus of claim 1, wherein the IP address is a first IP address and a first partition of the selected subset is associated with a second IP address that uniquely identifies the first partition.

13. The apparatus of claim 1, wherein the one or more storage elements are configured to implement a multicast span.

14. A method comprising:
   receiving, by one or more storage elements, a packet via a network connection, the packet including an internet protocol (IP) address that uniquely identifies a selected subset of a plurality of partitions, of one or more storage media, distinct from a non-selected subset of the plurality of partitions, the selected subset including at least two non-consecutive partitions, the packet further including a datagram having a command and a block address; and
   accessing, by a storage element of the one or more storage elements, a block within a partition of the selected subset based on the command, the block address, and the IP address.

15. The method of claim 14, wherein the partition is a first partition, the physical block is a first physical block, and a second partition of the selected subset includes a second physical block that corresponds to the logical block address and the method further comprises:
   accessing the second physical block based on the packet.

16. The method of claim 14, further comprising:
   accessing a block within each partition of the selected subset based on the command, the block address, and the IP address.

17. The method of claim 14, further comprising:
   accessing, by a plurality of storage elements, a respective plurality of partitions based on the command, the block address, and the IP address.

18. A method comprising:
   receiving, via a network interface, a partition request from a network entity;
   partitioning, based on the partition request, one or more storage media into a plurality of partitions;

assigning an internet protocol (IP) address to a selected subset of the plurality of partitions, wherein the selected subset includes at least two non-consecutive partitions and the IP address uniquely identifies the selected subset distinct from a non-selected subset of the plurality of partitions;

transmitting, via the network interface to the network entity, the IP address;

receiving, via the network interface, a packet including the IP address and a block address;

determining that the block address uniquely corresponds to a first partition of the selected subset; and accessing the first partition based on said determining.

19. The method of claim 18, further comprising:

implementing a multicast span based on receipt of the packet.

20. The method of claim 19, wherein the implementing of the multicast span comprises:

issuing duplicative commands to the selected subset of the plurality of partitions.

* * * * *

UNITED STATES PATENT AND TRADEMARK OFFICE
CERTIFICATE OF CORRECTION

| | | |
|---|---|---|
| PATENT NO. | : 8,473,578 B2 | Page 1 of 1 |
| APPLICATION NO. | : 13/193544 | |
| DATED | : June 25, 2013 | |
| INVENTOR(S) | : Frank et al. | |

It is certified that error appears in the above-identified patent and that said Letters Patent is hereby corrected as shown below:

On the Title Page

On Page 3, in Item (56), under "OTHER PUBLICATIONS", in Column 1, Line 21, delete "Vo." and insert -- Vol. --, therefor.

On Page 3, in Item (56), under "OTHER PUBLICATIONS", in Column 2, Line 23, delete "mini-HOWTO" and insert -- mini-HOWTO; --, therefor.

In the Specification

In Column 1, Line 4, delete "APPLICATION" and insert -- APPLICATIONS --, therefor.

In Column 2, Line 24, delete "DRAWING" and insert -- DRAWINGS --, therefor.

In Column 4, Line 12, delete "same" and insert -- some --, therefor.

In Column 4, Line 49, delete "a IP" and insert -- an IP --, therefor.

In Column 6, Line 58, delete "an storage" and insert -- a storage --, therefor.

In the Claims

In Column 7, Line 48, in Claim 1, delete "configured" and insert -- configured: --, therefor.

In Column 7, Line 61, in Claim 2, delete "comprise" and insert -- comprises --, therefor.

In Column 8, Line 65, in Claim 18, delete "entity:" and insert -- entity; --, therefor.

Signed and Sealed this
First Day of April, 2014

Michelle K. Lee
*Deputy Director of the United States Patent and Trademark Office*